United States Patent [19]

Chen et al.

[11] 3,947,851

[45] Mar. 30, 1976

[54] DROP CHARGING METHOD FOR LIQUID DROP RECORDING

[75] Inventors: Winston H. Chen, San Jose, Calif.; Ho C. Lee, Owego, N.Y.

[73] Assignee: International Business Machines Corporation, Armonk, N.Y.

[22] Filed: June 27, 1974

[21] Appl. No.: 483,503

[52] U.S. Cl. .......... 346/1; 346/75

[51] Int. Cl.² .......... G01D 15/18

[58] Field of Search .......... 346/75, 1

[56] References Cited

UNITED STATES PATENTS

| | | | |
|---|---|---|---|
| 3,373,437 | 3/1968 | Sweet et al. | 346/75 |
| 3,596,275 | 7/1971 | Sweet | 346/75 X |
| 3,787,881 | 1/1974 | Duffield | 346/75 |
| 3,846,800 | 11/1974 | Chen | 346/75 X |

FOREIGN PATENTS OR APPLICATIONS

| | | | |
|---|---|---|---|
| 1,123,188 | 8/1968 | United Kingdom | 346/75 |

*Primary Examiner*—Joseph W. Hartary
*Attorney, Agent, or Firm*—Kenneth P. Johnson

[57] ABSTRACT

Method of recording with a stream of marking fluid drops in which a predetermined plurality of successively formed drops in a stream each have the same electrical charge induced therein so that, when subsequently subjected to an electrostatic field, all drops of one commonly charged plurality will impact a record member at approximately the same spot. Drop charges are induced therein by asynchronously applied charging signal levels, each having a duration which is a function of the drop formation frequency and equal to at least two drop periods.

4 Claims, 5 Drawing Figures

DROP CHARGING METHOD FOR LIQUID DROP RECORDING

BACKGROUND OF THE INVENTION

In the art of making a record member with drops of charged fluid, difficulty has been encountered in inducing the desired charge on a drop because of the drift in phase relationship between applied charging signals and the instant of drop formation when induced charges are created within the drop. The loss of synchronization between the applied charge and drop formation results in the drops attaining either insufficient or excessive charge and thus subsequently achieving an erroneous trajectory when subjected to an electrostatic deflection field. Misplaced drops on a receiving record member are noticeable and the printing thereon assumes a smudged or fuzzy appearance.

The customary corrections used to overcome the loss of synchronization have been to install sensors along the drop path or to use a multi-compartment sensing gutter for discarded drops and detect departure from some pre-established norm in electrical signal. The change in signal level is then used as an error signal to alter the phase relation between drop formation and charging. Corrections are made in drop formation time and location by altering fluid pressure or temperature. Charging signal timing is varied by changing electrical circuit delay by either analog or digital controls. These controls obviously add structure and complexity to the drop charging and forming apparatus.

A further difficulty experienced in marking with charged fluid drops is that of obtaining density control of the deposited liquid. Techniques to accomplish this have included variable dispersion of drops directed toward a recording surface through an opening in a shield. By producing a fine spray with variable dispersion there is control over the amount of marking fluid impacting the recording surface. This technique requires that the shield opening serve to limit or control the diameter of the formed mark.

Another technique is that of recording in small advancing increments between marking jet and rotating recording surface to enable selected drop placement in a matrical position. A varying number of these positions can be impacted through jet control to create the desired density effect.

Another technique is that of controlling the merging of formed drops in flight by establishing mutually attractive charges on adjacent drops. Drop merging requires complicated switching circuits in order to control the charging signal and to obtain the proper ultimate drop size. These techniques of density control necessitate either additional structure or complex data handling and storage arrangements, adding to the cost and at times impairing recording efficiency.

It is accordingly a primary object of this invention to provide a method of marking with charged drops of marking fluid in which synchronization between charging signals and drop formation is not required.

A further object of this invention is to provide a method of marking with charged drops in which a plurality of similarly charged drops are used to create a single mark on a recording surface.

Another important object of this invention is to provide a method of marking with charged drops in which each charging signal level induces similar charges on a plurality of successive drops.

A still further object of this invention is to provide a method of marking with charged drops of marking fluid in which the drop generation frequency is an integral multiple of the charging signal or data frequency.

A further object of this invention is to provide a method of marking with charged drops of fluid in which a range of density of marking fluid on a recording surface is attained by varying the number of successively and similarly charged drops impacting each predetermined recording area.

SUMMARY OF THE INVENTION

The foregoing objects are attained in accordance with the invention by generating a stream of drops of electrically conductive marking fluid of uniform size and spacing, directing said drops toward a recording surface, and selectively charging a plurality of successive drops with each charging signal having a constant magnitude and a duration equal to at least two drop periods. These charged drops are then subjected to a constant electrostatic field so that the charged drops are deflected from their original trajectory according to the charges carried thereby. Drops in a plurality follow nearly identical trajectories and impact the recording surface in succession at approximately the same location. The recording surface may be moved continuously or incrementally during recording along an axis orthogonal to the direction of drop deflection.

Each recorded mark can be varied in size by varying the number of originally formed drops that are deflected to the particular marking area. In character generation, the number of drops directed to each recording spot is usually the same, while for non-coded information, such as in facsimile generation, the number of drops per recording signal may vary in accordance with the desired spot size and, hence, density. The invention is also readily adapted to recording in the binary or on-off mode in which recorded drops are either those charged or those uncharged.

Drops are generally produced at a frequency which is an integral multiple of the data rate or charging signal rate so that at least two, and optionally a greater number, of drops form each recorded mark corresponding to each recording signal. Drops are produced of smaller diameter and volume than usual to allow for the recording of multiple drops per mark. When the disclosed technique is used for recording, the synchronization of charging signals with drop generation is unnecessary since the small drops are not readily discernible to the naked eye. Some single drops can receive partial charges during the transition of the charging signal levels and impact recording surface at unwanted location virtually unnoticed. The ommission of synchronizing elements and circuits simplifies drop control without significant degradation of printing quality.

The foregoing and other objects, features and advantages of the invention will be apparent from the following more particular description of preferred embodiments of the invention as illustrated in the accompanying drawings.

DESCRIPTION OF THE PREFERRED EMBODIMENT

Figure 1:
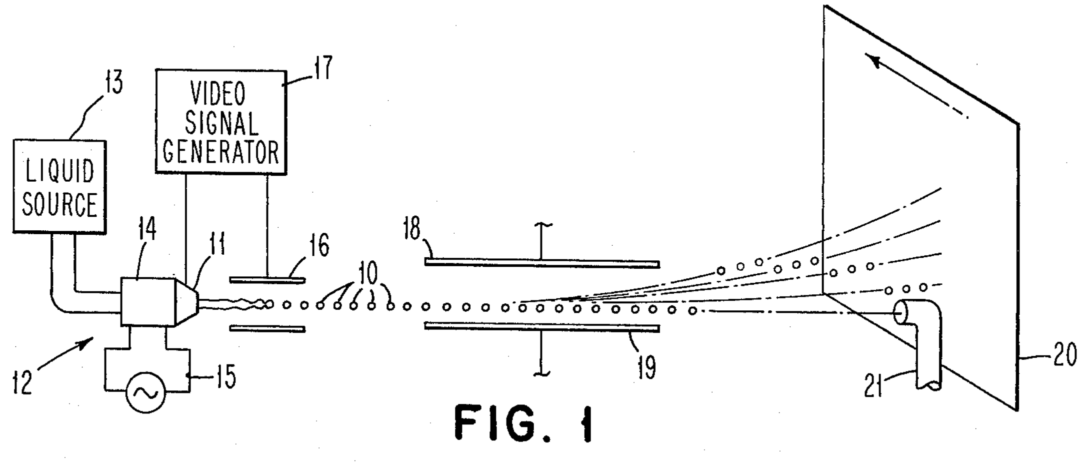
FIG. 1 is a schematic diagram of a liquid drop recording apparatus operated in accordance with the principles of the invention.

Referring to FIG. 1, a stream of drops 10 of conductive marking fluid such as ink, issues from nozzle 11 of print head 12 which is supplied with fluid under pressure from a suitable source 13. The stream issues initially as a filament of fluid and later, due to the surface tension and non-uniform cross-section, breaks into drops. However, to insure that the drops form of uniform size and spacing, the print head 12 and issuing fluid are acted upon by means 14 such as a commonly used piezoelectric vibratory circuit 15 to form drops at a desired constant frequency.

Located proximate the point of transition from fluid filament to drops is a charging electrode 16 connected to a video signal generator 17. This generator controls the magnitude and duration of charging voltage levels applied to electrode 16 and, hence, the induced charges on newly formed drops 10. The charged drops thereafter pass through an electrostatic field established between deflection plates 18 and 19 connected to a suitable DC potential, not shown. Each drop 10 is deflected during progression within the field according to the respective charge each carries and follows the attained trajectory to impact the surface of recording member 20. Drops to be discarded are left uncharged or only slightly charged so that they are, in effect, undeflected by the electrostatic field and impact a gutter 21 for subsequent return to source 13.

Accurate drop placement in the past has required close synchronization between the applied charging signal levels and drop formation time within electrode 16. Control of the synchronization is usually accomplished by using charge detection devices, comparing circuits, and adjustable signal delays to maintain the rigid control. In this invention, no attempt is made to maintain such synchronization; drop charging signals are applied from video generator 17 independently of drop formation. The size of individual drops is made smaller and individual charging signals occur at a frequency equal to one-half or less of the drop generation frequency. In other words, the duration of each charging signal is equal to at least two drop periods. The result of such charging is that a plurality of successive drops receive the same charge and will impact the record member at substantially the same point. There is some negligible misalignment of likecharged drops when the record member is continuously moving during printing; however, this is not noticeable as the displacement of the record member during the time interval of drop-to-drop period is extremely small.

Figure 2:
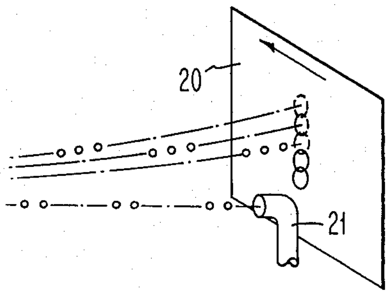
FIG. 2 is an enlarged view of recorded marks resulting from the operation of the apparatus shown in FIG. 1.

The nozzle used to produce the fluid filament and drops 10 is of smaller cross-section than those conventionally used and ranges in size from 0.7 mil to 1.0 mil or less. This produces drops of 1.4 to 2.1 mils in diameter that usually result in independently produced recorded marks of 2 to 3.5 mils in diameter. The drops are preferably produced at a frequency which will permit a relatively high data rate such as 80 to 120 KHz in charging level frequency. Thus, if two drops are to be charged with each charging signal, this would require a drop frequency of 160 to 240 KHz. In the event it is desirable to charge three drops per charging signal level, then, of course, the data rate is reduced or drop frequency is increased; a drop frequency of 240 KHz would be necessary to maintain a data frequency rate of 80 KHz. The drop size and generation frequency can be varied to meet particular recording requirements. In FIG. 1 the drops are schematically indicated as being charged in groups of three. FIG. 2 is an enlarged view of the generation of a vertical line segment as it is formed by similarly charged drops in each plurality.

Figure 3:
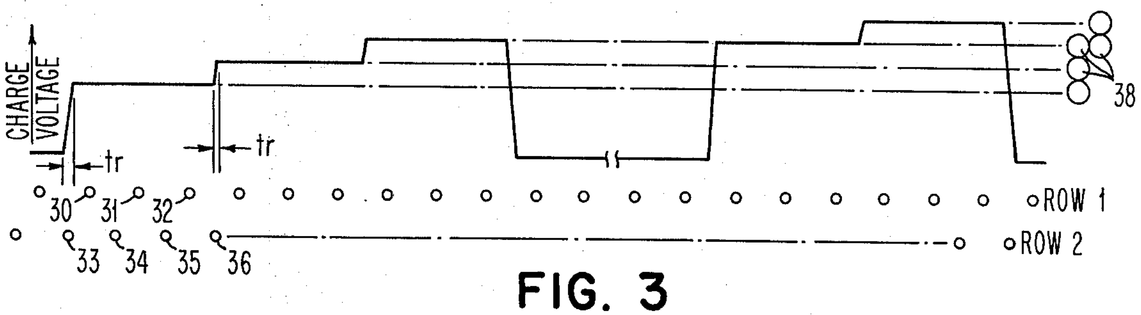
FIG. 3 is a schematic illustration of the drop charging technique for liquid drops to form marks which are composites of a plurality of charged liquid drops.

The synchronization between drop formation and charging signal application is not critical because the drop size produces a relatively small recorded mark in the event a drop receives a charge intermediate that of the preceding or succeeding mark. Referring to FIG. 3, there is illustrated a charging signal with several levels of selected values having a rise time designated Tr. The drops of marking fluid in Row 1 will be seen to be in synchronism with the charging signal as they formed so that for one particular charging level three drops 30, 31 and 32 are charged in this case. Marks 38 indicate relative impact locations for the charged drop pluralities. Upon considering the generation of drops in Row 2, however, it will be seen that drops 33 and 36 are produced during the transition between charging signal levels. Only two drops 34 and 35 will receive the same full charge, since they were produced during the time that the charging voltage was constant. As all drops pass through the deflection field, drops 33 and 36, which were charged during a transition period will be deflected differently than the drops 34 and 35 therebetween. Accordingly, these drops which received improper charges will impact the recording medium at a slightly different location than that intended.

When printing a line or segment thereof, drops partially charged during a signal transition to a greater level are not apparent since they fall on previously recorded drops. However, when the charging level changes from one value to another which omits one or more of the intervening drop composites, then there is a possibility that the partially charged drop will be noticeable, since its charge will dictate that it will fall in a relatively clear record area. By using the smaller nozzle sizes such as the 0.7 mil, drop size is 1.4 mil in diameter and alone will produce a mark on a record member of approximately 2.1 mils in diameter. In the conventional 100 mil by 80 mil character such drops are not readily discernible to the human eye and go relatively unnoticed. In addition, if each drop plurality is increased to contain a larger number of drops then drops mischarged during a signal transition will make a mark smaller in relative size.

Figure 4:
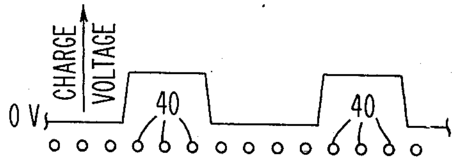
FIG. 4 is an illustration of a charging signal for liquid drops when using the binary charging technique.

The invention is also readily adaptable to the binary type of drop control shown in FIG. 4 in which drops are either charged or uncharged. Charged drops each receive the same charge. When recording with charged drops 40, the charging signals may be applied asynchronously in the same manner as described above for several charging levels. If only uncharged drops are used for recording then, of course, the drops used for marking are merely left uncharged for the desired length of the line segment.

Figure 5:
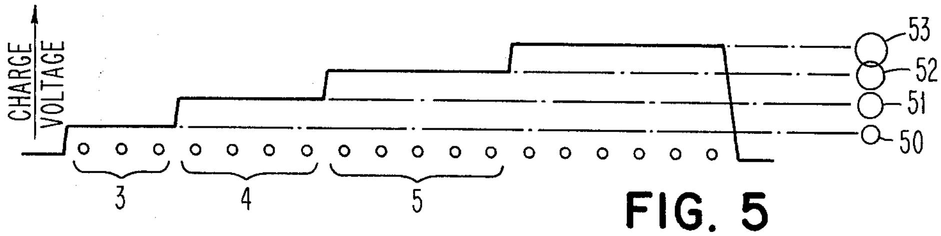
FIG. 5 is an illustration of a charging technique for liquid drops in which the recorded marks can be varied in size.

The invention also lends itself to generation of nonformatted recording because of the ability to provide a variable density recording. This capability is valuable in achieving the production of unusual character fonts or half-tone images for uncoded data such as facsimile production. Because of the asynchronous technique of charging pluralities of successive drops, the charging signal can be easily varied in duration to produce like charges on variable numbers of drops in a plurality such as three, four, five, etc. The result is that the recorded mark can be altered in size according to the number of drops used to form the composite mark. Merely by changing the duration of the charging signal as shown in FIG. 5, diameters of recorded marks 50–53 are varied. This allows a density signal from a sensing device to be directly converted into a digital value which is thereafter used to produce an equivalent duration for the charging signal. This process of achieving gray scale simplifies the circuitry formerly required when a recording system necessitated numerous conversion and storage facilities. The variable number of drops used to form a recorded mark can be used in either the multi-level charging signal or the binary type of recording and, hence, can be used with either the fixed matrix or analog type recording.

While the invention has been particularly shown and described with reference to preferred embodiments therefor, it will be understood by those skilled in the art that the foregoing and other changes in form and details may be made therein without departing from the spirit and scope of the invention.

What is claimed is:

1. A method of recording with a jet of marking fluid on a recording surface comprising the steps of:

generating a stream of drops of marking fluid of substantially uniform size and spacing directed toward a nonrecording location;

inducing electrical charges in selected pluralities of successive drops for deposit on said recording surface with each drop in a selected plurality having the same charge as each other drop in said plurality and successive selected pluralities having different induced charge values thereon; and subjecting all said drops to an electrostatic field to deflect said drops in each selected plurality along substantially the same trajectory toward said surface according to the said induced charge thereon whereby the range of density of marking fluid on said recording surface is attained by varying the number of said successively and similarly charged drops impacting each predetermined recording area.

2. A method according to claim 1 including the further step of producing relative movement between said record member and the drop generating source during the generation of said drops.

3. A method according to claim 1 wherein said charging signals are equal to at least three drop periods.

4. A method according to claim 1 wherein said charging signals have variable durations greater than two drop periods.

* * * * *